United States Patent [19]

Marley

[11] 3,742,200

[45] June 26, 1973

[54] ANALOG TO DIGITAL CONVERSION APPARATUS FOR USE WITH TRACING SYSTEM TO PRODUCE A STORED PROGRAM THEREFROM

[75] Inventor: Thomas C. Marley, Cincinnati, Ohio

[73] Assignee: Cincinnati Milacron Inc., Cincinnati, Ohio

[22] Filed: May 6, 1971

[21] Appl. No.: 140,756

[52] U.S. Cl. .......... 235/154, 318/576, 340/347 NT

[51] Int. Cl. .......... G06f 3/00

[58] Field of Search .......... 340/347, NT, 347 AD; 318/576, 577, 578; 235/151.11, 154

[56] References Cited

UNITED STATES PATENTS

| | | | |
|---|---|---|---|
| 3,634,688 | 1/1972 | DiRocco | 340/347 NT |
| 3,617,885 | 11/1971 | Wheable | 340/347 AD |
| 3,686,665 | 8/1972 | Elias | 340/347 NT |
| 3,480,948 | 11/1969 | Lord | 340/347 NT |
| 3,414,818 | 12/1968 | Reidel | 340/347 NT |

*Primary Examiner*—Maynard R. Wilbur
*Assistant Examiner*—Jeremiah Glassman
*Attorney*—Howart T. Keiser and Jack J. Earl

[57] ABSTRACT

An apparatus for use with a tracing system, the apparatus converting an analog deflection signal generated by the tracing stylus into a quantized pulse signal and a polarity signal to be received by the accumulator of a numerical control system to produce a stored program therefrom.

2 Claims, 4 Drawing Figures

INVENTOR.
THOMAS C. MARLEY
BY
ATTORNEYS

ANALOG TO DIGITAL CONVERSION APPARATUS FOR USE WITH TRACING SYSTEM TO PRODUCE A STORED PROGRAM THEREFROM

BACKGROUND OF THE INVENTION

In conversion systems, the information to be converted is most commonly in one of two forms. One form is an analog signal present on a single line or flow path whose magnitude gives the value of some phsical quantity. The second form is discrete bits of information when taken as a total represent the same physical quantity.

The need for converting from one system to the other most commonly arises when the physical phenomenon is measured directly in analog form and modified by processing equipment. In general, processing apparatus works with language supplied in a digital format. When the analog signal is to be converted to a format for use with a numerical control system, the signal must generally be in a series of quantized pulses with a separate binary signal to represent polarity.

The present invention provides an unique apparatus for dividing these signals when said numerical control is to be utilized for producing a stored program from signals generated by a tracing system.

THE DRAWINGS

DETAILED DESCRIPTION

Figure 1:
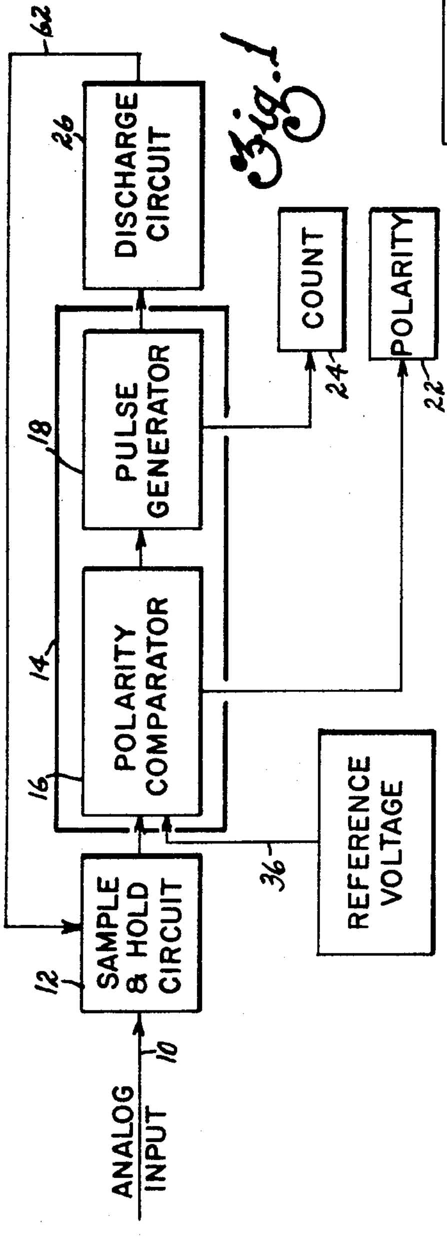
FIG. 1 is a signal flow chart of the convertor of the present invention.

Referring first to FIG. 1, an analog amplitude signal is the input 10 to sample and hold circuit 12. The sample and hold circuit 12 periodically samples and stores input 10. The signal thus stored is translated by conversion means 14 into a digital format consisting of a series of quantized pulses and a signal representing the polarity of the signal stored in hold circuit 12. The conversion means 14 is a combination of elements including a polarity comparator comparator and a pulse generator 18. The polarity compartor 16 determines the polarity of the input 10 as sampled and stored with respect to the polarity of the reference voltage signal provided by potentiometer 36. Once the polarity has been determined the comparator 16 produces an output indicating the correct polarity of the stored signal at polarity display 22. The presence of an output produced by the comparator 16 is also registered by pulse generator 18. As long as the polarity 22 remains unchanged the generator 18 will produce pulses. The number of pulses is displayed at a count display 24. Thus, when the count stored in display 24 and the polarity signal stored in display 22 are used in combination an output representing the magnitude and polarity of the analog signal stored in the sample and hold circuit 12 is produced.

While generator 18 is producing pulses, discharge circuit 26 produces a predetermined output flow to reduce the signal stored in sample and hold circuit 12. The output of discharge circuit 26 is proportional to the magnitude represented by pulses generated by generator 18.

For example, each time one pulse representing a millivolt is generated the output flow produced by discharge circuit 26 reduces the signal stored in sample and hold circuit 12 by 1 mv. Thus, if the stored signal is greater than 4 mv. but less than 5 mv. positive with respect to reference signal 36, the polarity comparator will generate a positive output indicating the polarity of the signal stored in hold circuit 12. The pulse generator 18 will start to produce pulses. Each time a pulse is generated, the discharge circuit 26 will produce an output that will reduce the stored signal 1 mv. After four pulses are generated, the stored signal will be between 0 and 1 mv. positive. The next pulse will cause the discharge circuit 26 to produce an output of 1 mv., reducing the stored signal to a magnitude between 1 mv. negative and zero. The comparator 16 will detect this change in polarity and halt the production of pulses by generator 18. Thus five positive pulses have been produced, each representing 1 mv., and the stored signal has been reduced to less than zero. The digital form of the stored analog signal is thus found to be between 4 and 5 mv.

The accuracy of the digital form is controlled by the quantized amount each pulse is allowed to represent. If, in the above example, each pulse represents ½ mv. and the stored analog signal was between 4 and 5 mv. either 9 or 10 pulses would be produced, the resolution being to the nearest ½ mv.

Figure 2:
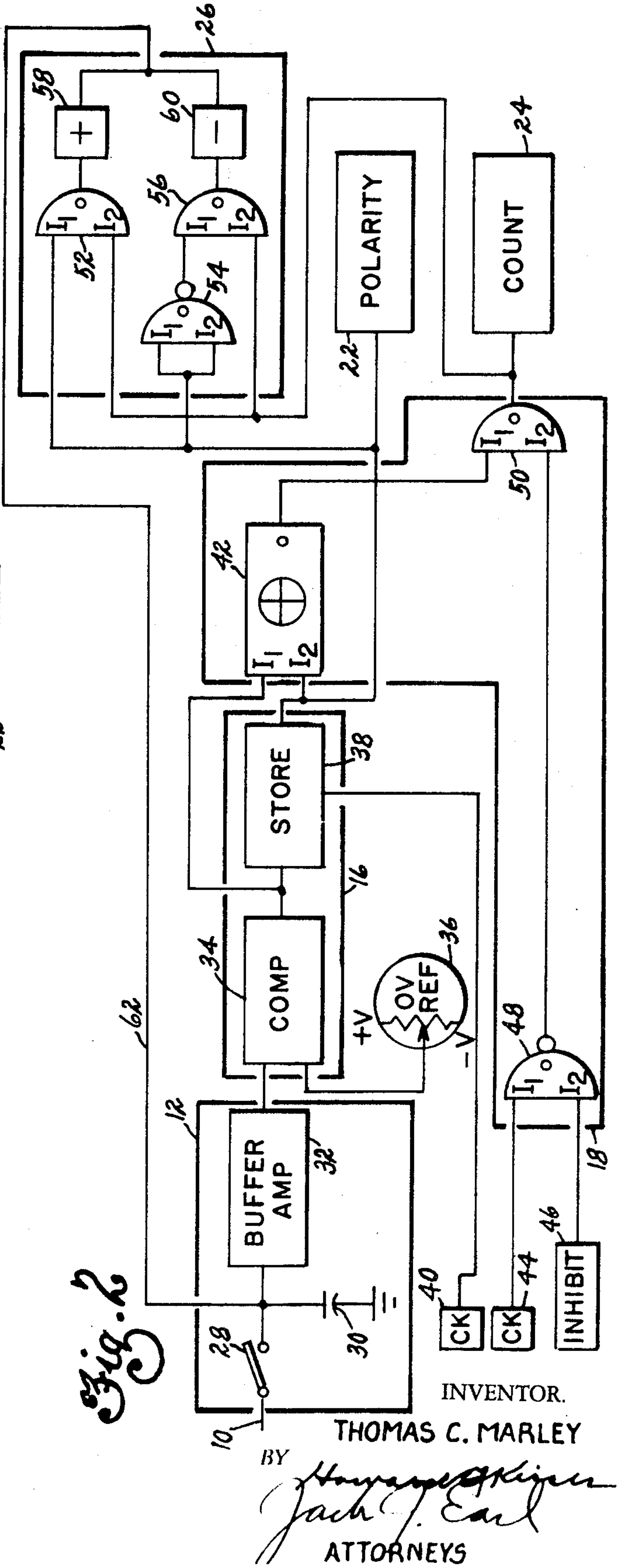
FIG. 2 is a schematic diagram representing the logic circuit of the convertor of the present invention.

FIG. 2 represents in more detail the convertor of the invention. An analog amplitude signal is always present at input 10 to sample switch 28. Sample switch 28 is merely a representation of a sampling circuit, and any sampling circuit well-known to those who are skilled in the art may be adapted for use in the present invention. At predetermined intervals the sampling switch 28 is closed allowing hold capacitor 30 to be charge to a level proportional to the analog signal then present at input 10. The switch 28 then is reopened and remains open until the next sampling period is reached.

The buffer amplifer 32 permits the signal stored in capacitor 30 to be used as a driver for forward components in the circuit without draining the capacitor 30. The capacitor 30 and the amplifer 32 represent a typical hold circuit wellknown to the art. This hold circuit combined with switch 28 form the sample and hold circuit 12 of FIG. 1.

The output of the buffer amplifer 32 is one input to the comparator 34. Reference voltage potentiometer 36 provides the second input. The comparator 34 is merely representative of any comparator well-known in the art and suitable for adaptation in the described context. The potentiometer 36 can be set at any point desired but for convenience will be presumed zero for the discussion herein. The output of comparator 34 is of the same polarity and proportional to the magnitude of the difference between the signal produced by amplifier 32 and the reference voltage produced by potentiometer 36. Thus the output of the comparator 34 in the instant case is of the same polarity as the sampled input stored in capacitor 30 and has a magnitude proportional thereto.

Store 38 receives as an input the output of comparator 34. When clock 40 generates a pulse the store 38 produces an output indicating the polarity of the signal stored by capacitor 30. The store 38 and the comparator 34 form the polarity comparator 16 of FIG. 1.

Figures 3, 4:
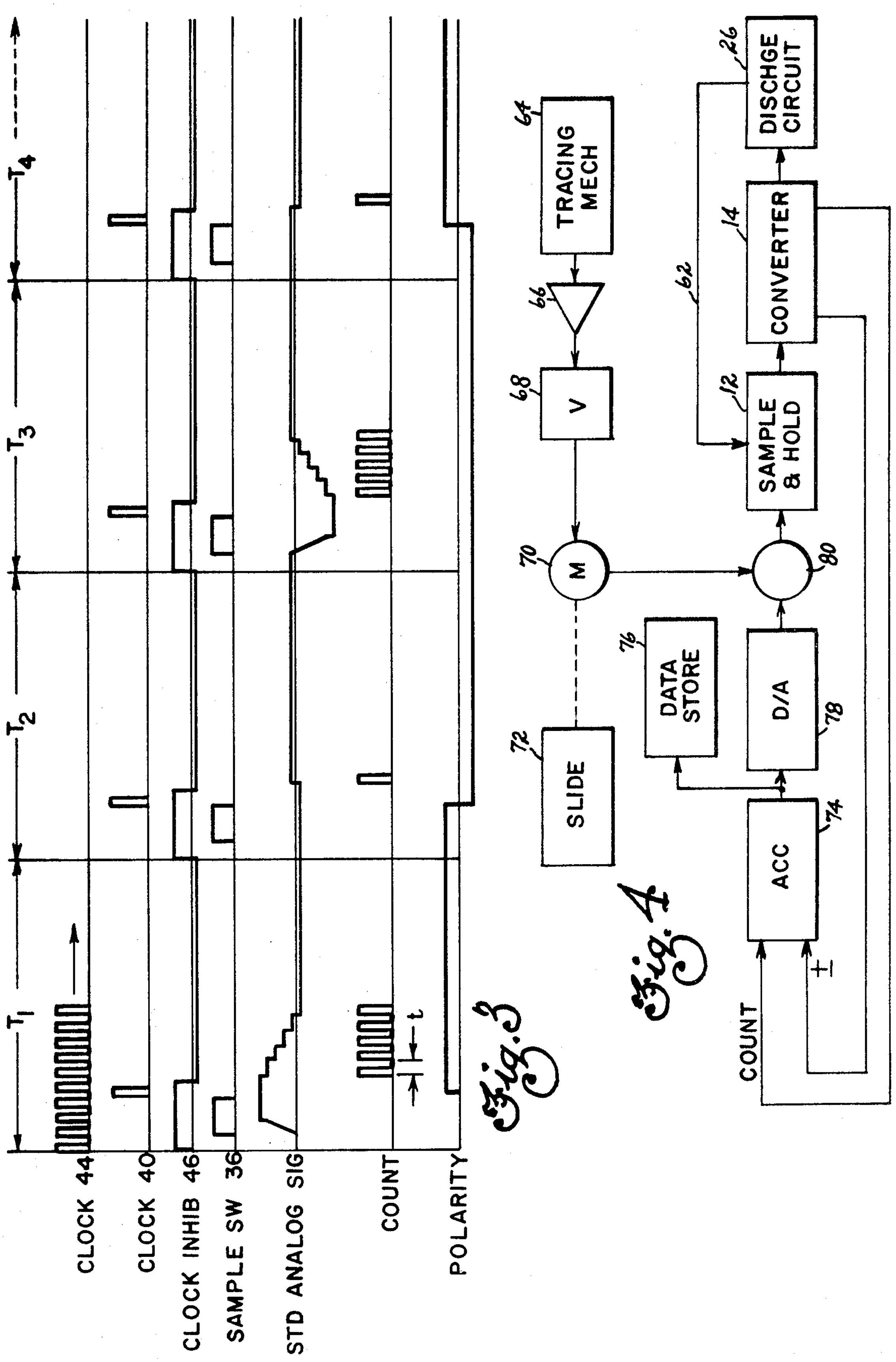
FIG. 3 is a synchrogram of the convertor.
FIG. 4 is a signal flow chart of of the preferred embodiment the present invention.

Referring to the synchrogram of FIG. 3, it can be seen that the clock 40 does not set store 38 until storage capacitor 30 is charged by closing sampling switch 28. The timing cycle of the convertor is described in detail further herein. Once the presence of a signal is detected by the comparator 34 and the store 38, the clock 40 sets the output of store 38 in agreement with the polarity of the signal represented by the charge on capacitor 30. The store 38 is simply a binary store and produces, for example, a true output when the polarity of the comparator 34 output is positive and a false output when negative. Assuming that positive is always true and negative is always false, the output of store 38 agrees in polarity with the output of comparator 34.

The output of comparator 34 is also one input ($I_1$) to the "exclusive-or" gate 42. The second input ($I_2$) to gate 42 is the output of store 38. It can be seen the second input to gate 42 is not received until set by clock 40. An "exclusive-or" circuit, well-known in the art, has the following characteristics assuming positive to be true and negative to be false:

TABLE I

| $I_1$ | $I_2$ | 0 |
|---|---|---|
| true | true | true |
| true | false | false |
| false | true | false |
| false | false | true |

Therefore, a true output (0) is generated by the gate 42 only when both inputs agree in polarity. In the instant case, as long as the stored signal in capacitor 30 remains positive the output of gate 42 will be true. When the charge on capacitor 30 crosses zero, or any other desired reference voltage, the signal becomes negative. At that time, the output of the comparator 34 becomes false. However, the output of store 38 remains true until clock 40 resets. There is then one true and one false input to gate 42, and gate 42 produces a false output.

As long as the output of gate 42 remains true the generator 18 is ready to produce pulses. As illustrated in FIG. 3, while sampling switch 28 is closed, and after it opens but before clock 40 sets store 38, clock 44 is inhibited by a true signal generated by clock inhibit 46. This permits the polarity signal to be set before any pulses are generated. After clock 40 sets the output of store 38, determining the polarity, the output of clock inhibit 46 goes false. The outputs of clock inhibit 46 and clock 44 are both inputs to a typical "nand" gate 48 which has the following characteristics:

TABLE II

| $I_1$ | $I_2$ | 0 |
|---|---|---|
| true | true | false |
| true | false | true |
| false | true | true |
| false | false | true |

The output of clock 44 is always true in the instant case. Therefore, only the first two possibilities in TABLE II are factors in the present description. As can be seen by the above table, when the output of clock inhibit 46 is true the output of gate 48 is false. This prevents any pulses being generated during the time sampling is in process and before polarity of the sample is determined (see FIG. 3).

After the output of store 38 is set by clock 40 the output of clock inhibit 46 goes false. Since the output of clock 44 is always true, never less than zero herein, the output of gate 48 becomes true.

Assume the input to the comparator 34 is the original charge on capacitor 30 and is positive with respect to the reference signal, here zero, produced by potentiometer 36. The output of comparator 34 will be true. The input to store 38 is true; and the first input ($I_1$) to gate 42 is true. Clock 40 sets store 38 and a true output is produced. The polarity display 22 is true. The second input ($I_2$) to gate 42 is true, producing a true output. Referring to FIG. 3, the output of clock inhibit 46 becomes false at this instant and the output of gate 48 is true, being a replica of the output of clock 44. The outputs of gate 42 and clock 48 are inputs $I_1$ and $I_2$, respectively, to gate 50.

Gate 50 is a typical "and" gate with the following characteristics:

TABLE III

| $I_1$ | $I_2$ | 0 |
|---|---|---|
| true | true | true |
| true | false | false |
| false | true | false |
| false | false | false |

$I_1$ and $I_2$ are both true at this time. The output of gate 50 will be true, and proportional to the pulses of clock 44 since $I_1$ is a constant. Thus, as long as both inputs to gate 50 are true, pulses will be generated and displayed at count display 24. These pulses, taken with the polarity displayed in polarity display 22 represent the stored analog signal in digital form.

Each pulse represents a fixed quantized amount. Therefore, as pulses are generated an amount equal to the magnitude represented by the number of generated pulse must be removed from the stored analog signal which is a charge on capacitor 30. The convertor of the invention reduces the stored signal by the amount represented by one pulse as each pulse is produced.

The polarity signal, produced by store 38, and the count, produced by gate 50, are also inputs to discharge circuit 26. The inputs are received by gate 52, an "and" gate similar to gate 50 for one branch of the discharge circuit 26. The other branch receives these inputs through "nand" gate 54 (similar to gate 48), and "and" gate 56. If the polarity signal is positive or true and pulses are being generated, both inputs to gate 52 are true. This produces a true output that turns on the positive signal discharge unit 58. Discharge unit 58 is a constant flow generator, for example, a constant current source that produces a fixed current flow each time it is turned on. Since each pulse is identical in length, the unit 58 produces the same flow each time it is turned on for the duration of one pulse. When there are a series of positive pulses, see FIG. 3, the unit 58 produces a flow that reduces the charge stored capacitor 30 by an amount represented by the complete series of pulses displayed in count display 24.

As the stored signal in capacitor 30 is reduced, it approaches the reference signal, here zero, produced by potentiometer 36. When the charge on capacitor 30 passes zero, the output of comparator 34 changes from true to false. Since store 38 does not set again until initiated by clock 40, the output of store 38 remains true. Thus the inputs $I_1$ and $I_2$ to gate 42 are false and true, respectively. The output of gate 42 (see TABLE I) is now false. Inputs $I_1$ and $I_2$ to gate 50 are now false and true respectively. The output of gate 50 (see TABLE III) becomes false and pulses are no longer produced. Also, it can be seen that the inputs $I_1$ and $I_2$ to gate 52 are true and false, respectively, producing a false output and stopping production of discharge flow from unit 58.

Thus, the stored charge on capacitor 30 has been reduced to less than zero and a series of quantized pulses have been produced representing the stored charge in digital form.

It can be seen if the sampled analog signal at input 10 would have been negative, instead of positive, that the comparator 34 would have produced a false output. Clock 40 would set the output of store 38 as false, indicating a negative polarity at display 22. Both inputs to gate 42 would be false, producing a true output (see TABLE I). When the output of clock inhibit 46 goes false, both inputs to gate 50 are true and pulses are generated as herein described. The discharge circuit 26 receives a false output from store 38 and a true input from gate 50. The output of gate 52 is false and unit 58 is not turned on. However, gate 54 similar to "nand" gate 48, receives and inverts the false input from store 38, producing a true output (see TABLE II). Both inputs to "and" gate 56 are true and negative signal discharge unit 60 is turned on driving the charge on capacitor 30 to zero in the same manner as herein described. Thus a quantized stream of pulses representing a negative analog signal are also produced by the present invention.

Referring to FIG. 3 in detail it can be seen that clock 44 is a continuous running clock producing pulses that eventually account for the output pulses displayed in count display 24 of the present system. Prior to sampling of the analog signal at input 10 the clock inhibit 46 will prevent any output being produced by the pulse generator 18. This condition continues through the sampling period "S" and until the polarity output of store 38 is set by clock 40. Once the store 38 is set and the polarity is determined, the clock inhibit 46 goes false allowing clock 44 to produce pulses representing the stored analog signal as herein described.

The apparatus of the convertor actually produces one more complete pulse than needed to reach zero. Where a positive analog input is sampled, the digital output will be slightly larger than the stored signal and a small negative error, equal to less than the magnitude represented by one pulse, will result. In the second sampling period, $T_2$, this error is eliminated by production of one pulse. Unless the stored signal is exactly equal to a number of quantized pulses a small error will always result. This is because an analog signal cannot generally be broken into a whole number of discrete parts. The absolute value of the output of the present system will always be larger than or equal to the absolute value of the sampled analog input. When a new sampling period, for example $T_3$, produces a different stored signal the process will repeat. The only timing requirement of the present system, other than limitation of physical components, is that T be of a magnitude sufficient to permit the generation of enough pulses, each having the period t, to reduce the maximum analog signal to zero before the output of clock inhibit 46 goes true and sample switch 28 closes. Thus if the maximum analog signal is equal to 1000 pulses, T would have to be $1000t$ plus Q, where Q is the period the output of clock inhibit 46 is true.

In a system where the maximum analog signal equals 1000 pulses, the full scale accuracy would be $N=A + 0.001A$, where $N$ is the number of pulses and $A$ is the stored analog signal.

FIG. 4 illustrates the present invention. In the particular system illustrated $T= 1000t + Q$, where $Q= 100t$, or $T=1100t$. The reference voltage potentiometer 36 is generally not set at zero because of an inherent error in the particular control system or because of a predetermined following error necessary for the functioning of the control apparatus.

The illustrated system includes an electronic tracing apparatus utilizing a standard numerical control to generate program data so that future parts may be produced through use of a program, instead of a template. The system is more fully described in U.S. Pat. No. 3,624,371 issued on 11-30-71 to N. D. Neal et al., titled, An Apparatus for Generating and Recording a Program and Producing a Finished Part Therefrom, Ser. No. 61,703, assigned to the present assignee. The tracing mechanism 64 follows a template (not shown) to generate and control movement of slide 72 holding a workpiece (not shown) relative to a cutting tool (not shown). The position of the tracing mechanism 64 is amplified by amplifier 66. The output of amplifier 66 controls valve 68. Valve 68 in turn controls motor 70. Motor 70 controls the position and velocity of the slide 72. Attached to motor 70 in the well-known manner is an apparatus for reading the position and velocity of the slide 72 at any instant in time. The resulting analog signal indicates the position of the slide 72 continuously while the tracing system is in use. This position information is then fed into sample and hold circuit 12 to produce the digital information as described in the foregoing paragraphs. The count and polarity outputs of the converter 14 are inputs to an accumulator 74. The accumulator 74 accumulates the pulses and generates an output serving as input to data store 76. Data store 76 provides data for use in programming. The output of the accumulator is converted to analog form through digital to analog converter 78 in the manner well-known. The analog output of converter 78 is algebraically summed at summing junction 80 with the position signal received from motor 70 to update the analog information used as input to sample and hold circuit 12. Thus the new position stored by data store 76 will be a position relative to the just prior position indicated by the previous outputs of the converter 14. In this manner information can be obtained to produce a program for numerically controlled machine tool utilizing a template as the program source, rather than a mathematical model.

It should be understood that the foregoing is merely illustrative and is not intended to limit the scope and spirit of the invention as defined in the attached claims.

What is claimed is:

1. In a machine tool control system including a tracing apparatus and a numerical control system wherein a tracing stylus follows a template to produce an analog deflection signal indicating the position of the stylus relative to the template, said analog deflection signal being utilized to produce a stored program for use in a numerical control system, said program utilized to recreate the signals produced by the tracing stylus to permit generation of a workpiece conforming to the shape of the template on a numerically controlled machine tool system without utilization of said tracing apparatus, said machine control system further comprises:

a. a first convertor for translating said analog deflection signal into a train of quantized pulses representing in digital format a magnitude proportional to said analog deflection signal and a binary signal having the same polarity as said analog deflection signal;

b. an accumulator for receiving said pulses and polarity signal for generating an output in response thereto;

c. a data store for receiving and permanently storing said accumulator output in recallable media, thereby producing a stored part program;

d. a digital to analog convertor for also receiving said accumulator output and producing an analog up-date signal; and e. a summing circuit for algebraically comparing said analog up-date signal with said analog deflection signal for producing an up-dated input signal to said convertor.

2. The apparatus of claim 1 wherein said first convertor further comprises:

a. sampling means periodically operable for producing an output signal having the same polarity as and proportional to said analog deflection signal;

b. storage means connected to said sampling means for receiving and holding the output signal of said sampling means and for producing an output signal having the same polarity therewith and proportional thereto, said output signal continuing until the signal held in the storage means reaches a predetermined level;

c. conversion means responsive to the output of said storage means for producing as a first output a train of quantized pulses representing a magnitude proportional to the output of said storage means, and producing as a second output a binary signal representing the polarity of the output of said storage signal; and d. discharge means responsive to said train of quantized pulses for periodically producing an output representative thereof for altering the signal held by said storage means.

* * * * *